US012807152B2

(12) United States Patent
Kuroda

(10) Patent No.: US 12,807,152 B2
(45) Date of Patent: Nov. 24, 2026

(54) VEHICLE TRAVEL CONTROLLER AND VEHICLE TRAVEL CONTROL METHOD FOR CONTROLLING ACCELERATION RATE

(71) Applicant: TOYOTA JIDOSHA KABUSHIKI KAISHA, Toyota (JP)

(72) Inventor: Ryusuke Kuroda, Tokyo-to (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 226 days.

(21) Appl. No.: 18/353,494

(22) Filed: Jul. 17, 2023

(65) Prior Publication Data

US 2024/0059286 A1 Feb. 22, 2024

(30) Foreign Application Priority Data

Aug. 22, 2022 (JP) ................................ 2022-131816

(51) Int. Cl.
*B60W 30/14* (2006.01)
*B60W 60/00* (2020.01)

(52) U.S. Cl.
CPC ........ *B60W 30/143* (2013.01); *B60W 60/001* (2020.02); *B60W 2540/10* (2013.01); *B60W 2540/223* (2020.02); *B60W 2540/225* (2020.02); *B60W 2720/106* (2013.01)

(58) Field of Classification Search
CPC .. B60W 30/00; B60W 60/00; B60W 2540/00; B60W 2720/00; B60W 50/00
See application file for complete search history.

(56) References Cited

U.S. PATENT DOCUMENTS

2002/0016653 A1* 2/2002 Levine .................... G08G 1/01 701/1
2009/0237226 A1* 9/2009 Okita .................. B60W 10/184 340/435
2017/0235311 A1* 8/2017 Sekijima ............... B60W 50/12 701/25
2018/0072325 A1* 3/2018 Koike ............. B60W 30/18163
2019/0232970 A1* 8/2019 Watanabe ........... B60W 30/143
2020/0282984 A1* 9/2020 Mizoguchi ........ B60W 30/0956
(Continued)

FOREIGN PATENT DOCUMENTS

JP 2015-182525 A 10/2015
JP 2020-6856 A 1/2020
JP 2020-83262 A 6/2020

*Primary Examiner* — Aniss Chad
*Assistant Examiner* — Elizabeth J Slowik
(74) *Attorney, Agent, or Firm* — Sughrue Mion, PLLC

(57) ABSTRACT

A travel controller, during autonomous driving in which acceleration and deceleration of a vehicle are automatically controlled, when an operation by a driver of the vehicle for accelerating the vehicle and a grip by the driver on a steering wheel accepting operations by the driver designating a steering direction and a steering amount of the vehicle are detected, control an acceleration rate of the vehicle by accelerating the vehicle in accordance with the operation for accelerating the vehicle with limiting the acceleration rate of the vehicle not more than a predetermined upper limit of acceleration rate, and increasing the upper limit of acceleration rate in accordance with an elapse of time from detection of the operation for accelerating the vehicle and the grip on the steering wheel.

6 Claims, 4 Drawing Sheets

(56) References Cited

U.S. PATENT DOCUMENTS

| | | | | |
|---|---|---|---|---|
| 2021/0276550 | A1* | 9/2021 | Gotou | G08G 1/16 |
| 2022/0063635 | A1* | 3/2022 | Kim | B60W 40/09 |
| 2022/0097684 | A1* | 3/2022 | Kadoya | B60W 30/143 |
| 2022/0306106 | A1* | 9/2022 | Sekikawa | B60W 40/105 |
| 2022/0379892 | A1* | 12/2022 | Archer | B60Q 1/26 |
| 2023/0034419 | A1* | 2/2023 | Abe | B60W 60/0059 |
| 2023/0356741 | A1* | 11/2023 | Hayakawa | B60W 30/18163 |
| 2023/0399013 | A1* | 12/2023 | Kume | B60W 60/001 |

* cited by examiner

VEHICLE TRAVEL CONTROLLER AND VEHICLE TRAVEL CONTROL METHOD FOR CONTROLLING ACCELERATION RATE

FIELD

The present disclosure relates to a travel controller and travel control method for controlling travel of a vehicle.

BACKGROUND

When a driver operates an operation acceptor for adjusting a control amount of a travel mechanism during autonomous driving where a travel controller controls travel of a vehicle, the travel controller may give precedence to the control amount based on the operation by the driver over a control amount determined by the travel controller for the control of the acceleration rate of the vehicle.

When control of the vehicle is switched all at once from the autonomous driving to a manual driving based on operations by the driver, the running state of the vehicle may become unstable in some cases. Japanese Unexamined Patent Publication No. 2020-083262 describes a vehicle control system which changes a control ratio of the autonomous driving and the manual driving when a request is made for switching to the manual driving during the autonomous driving, so that the control ratio of the autonomous driving decreases and the control ratio of the manual driving increases along with time and the control ratio also changes in accordance with the vehicle speed.

SUMMARY

When transitioning from the autonomous driving to the manual driving, if an operation acceptor (for example, an accelerator pedal) is excessively operated, even though the control ratio of manual driving is kept low, the final control value may be so high as to provoke rapid acceleration and driving safety may not be secured sufficiently.

It is an object of the present disclosure to provide a travel controller that inhibits sudden acceleration when an operation acceptor of a vehicle is operated during autonomous driving even though the vehicle is accelerated in accordance with an amount of operation by a driver on the operation acceptor.

The gist of the present disclosure is as follows:

(1) A travel controller comprising a processor configured to, during autonomous driving in which acceleration and deceleration of a vehicle are autonomously controlled, when an operation by a driver of the vehicle for accelerating the vehicle and a grip by the driver on a steering wheel accepting operations by the driver for designating a steering direction and a steering amount of the vehicle are detected, control an acceleration rate of the vehicle by accelerating the vehicle in accordance with the operation for accelerating the vehicle with limiting the acceleration rate of the vehicle not more than a predetermined upper limit of acceleration rate, and increasing the upper limit of acceleration rate in accordance with an elapse of time from detection of the operation for accelerating the vehicle and the grip on the steering wheel.

(2) The travel controller according to (1) above wherein the processor, in the control of acceleration rate, increases the amount of increase of the upper limit of acceleration rate along with the elapse of time when an operation by the driver for changing lanes is detected in comparison to when the operation by the driver for changing lanes is not detected.

(3) The travel controller according to (1) or (2) above wherein the processor in the control of the acceleration rate, decreases the amount of increase of the upper limit of acceleration rate along with the elapse of time when a gaze direction of the driver is not oriented in a travel direction of the vehicle in comparison to when the gaze direction of the driver is oriented in the travel direction of the vehicle.

(4) The travel controller according to any one of (1) to (3) above, wherein the processor, in the control of the acceleration rate, accelerates the vehicle in accordance with the operation for accelerating the vehicle with limiting the acceleration rate corresponding to a combined control value calculated combining a manual control value corresponding to the operation by the driver for accelerating the vehicle and a control value for accelerating the vehicle by the autonomous control at a predetermined ratio not more than the upper limit of acceleration rate.

(5) The travel controller according to (4) above wherein the processor in the control of the acceleration rate, calculates the combined control value so that the ratio of the manual control value rises along with the elapse of time.

(6) A travel control method by a travel controller that can autonomously control acceleration and deceleration of a vehicle, comprising:

- during autonomous driving in which acceleration and deceleration of the vehicle are autonomously controlled, when an operation by a driver of the vehicle for accelerating the vehicle and a grip by the driver on a steering wheel accepting operations by the driver for designating a steering direction and a steering amount of the vehicle are detected,
  - limiting the acceleration rate of the vehicle not more than a predetermined upper limit of acceleration rate,
  - accelerating the vehicle in accordance with the operation for accelerating the vehicle, and
  - increasing the upper limit of acceleration rate in accordance with an elapse of time from detection of the operation for accelerating the vehicle and the grip on the steering wheel.

(7) A non-transitory computer-readable medium having a computer program for travel control stored therein, the computer program causing a computer mounted on a vehicle to execute a process comprising:

- during autonomous driving in which acceleration and deceleration of the vehicle are autonomously controlled, when an operation by a driver of the vehicle for accelerating the vehicle and a grip by the driver on a steering wheel accepting operations by the driver for designating a steering direction and a steering amount of the vehicle are detected,
  - limiting the acceleration rate of the vehicle not more than a predetermined upper limit of acceleration rate,
  - accelerating the vehicle in accordance with the operation for accelerating the vehicle, and
  - increasing the upper limit of acceleration rate in accordance with an elapse of time from detection of the operation for accelerating the vehicle and the grip on the steering wheel.

The travel controller according to the present disclosure inhibits sudden acceleration when an operation acceptor of a vehicle is operated during autonomous driving even though the vehicle is accelerated in accordance with an amount of operation by a driver on the operation acceptor.

DESCRIPTION OF EMBODIMENTS

A travel controller that inhibits sudden acceleration when an operation acceptor of a vehicle is operated during autonomous driving even though the vehicle accelerates in accordance with an amount of operation of the operation acceptor by a driver will now be described in detail with reference to the attached drawings. The travel controller determines whether an operation by a driver of a vehicle for accelerating the vehicle has been detected during autonomous driving in which acceleration and deceleration of a vehicle are autonomously controlled. The travel controller further determines whether the driver has gripped a steering wheel which accepts operations of the driver for designating a steering direction and a steering amount of the vehicle during autonomous driving. When an operation by the driver for accelerating the vehicle and a grip by the driver on the steering wheel are detected during autonomous driving, the travel controller controls an acceleration rate by accelerating the vehicle in accordance with the operation for accelerating the vehicle with limiting the acceleration rate of the vehicle not more than a predetermined upper limit of acceleration rate. In this control of acceleration, the travel controller increases the upper limit of acceleration rate in accordance with the elapse of time from detection of the operation for accelerating the vehicle and the grip on the steering wheel.

Figure 1:
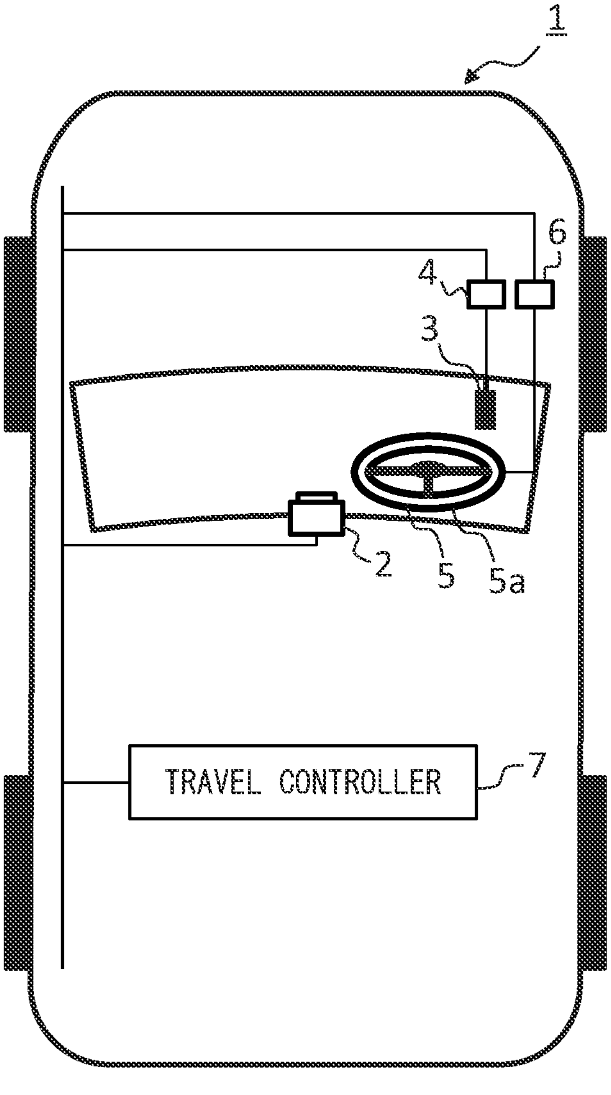
FIG. 1 schematically illustrates the configuration of a vehicle equipped with a travel controller.

FIG. 1 schematically illustrates the configuration of a vehicle in which a travel controller is mounted.

The vehicle 1 includes a surrounding camera 2, an accelerator pedal 3, an acceleration controller 4, a steering wheel 5, a steering controller 6, and a travel controller 7. The surrounding camera 2, the acceleration controller 4, the steering controller 6, and the travel controller 7 are connected via an in-vehicle network conforming to a standard, such as a controller area network, so that they can communicate with each other.

The surrounding camera 2 is an example of a surrounding sensor for generating surrounding data representing the situation around the vehicle 1. The surrounding camera 2 includes a two-dimensional detector constructed from an array of optoelectronic transducers, such as CCD or C-MOS, having sensitivity to visible light and a focusing optical system that forms an image of a target region on the two-dimensional detector. The surrounding camera 2 is disposed, for example, in a front and upper area in the interior of the vehicle and oriented forward. The surrounding camera 2 takes pictures of the surroundings of the vehicle 1 through a windshield every predetermined capturing period (e.g., 1/30 to 1/10 seconds) and outputs surrounding images as surrounding data showing the situation in the surroundings of the vehicle 1. The vehicle 1 may alternatively or additionally have, as a surrounding sensor, a sensor other than the surrounding camera 2, for example, a LiDAR (light detection and ranging) sensor which generates as surrounding data a range image whose pixels each has values depending on the distances to an object represented in those pixels based on the surrounding state of the vehicle 1.

The accelerator pedal 3, which is an example of an acceleration operation acceptor accepting an operation by a driver for adjusting the acceleration rate of the vehicle 1, outputs to the acceleration controller 4 a signal corresponding to the operation by the driver for adjusting the output of the drive source such as the engine or motor for supplying motive power to the vehicle 1. The operation for increasing the output of the drive source is, for example, a depressing operation of the accelerator pedal 3.

The acceleration controller 4 is an ECU (electronic control unit) having a communication interface, a memory, and a processor. The acceleration controller 4 is an example of a control device provided at the vehicle 1, for receiving a signal corresponding to an operation by the driver from the accelerator pedal 3 and sends it to the travel controller 7.

The steering wheel 5 is an example of a steering operation acceptor for accepting operations of the driver for adjusting the steering direction and a steering amount of the vehicle 1. The steering wheel 5 outputs to the steering controller 6 a signal corresponding to an operation by the driver for requesting operation of the steering mechanism for steering the vehicle 1. The operation requesting operation of the steering mechanism is, for example, a turning operation of the steering wheel 5 to the right or to the left.

The steering wheel 5 includes a steering holding sensor 5*a*. The steering holding sensor 5*a* is an example of a sensor equipped in the vehicle 1. The steering holding sensor 5*a* outputs a steering holding signal corresponding to whether the driver is holding the steering wheel to the steering controller 6. The steering holding sensor 5*a* is, for example, an electrostatic capacitive sensor provided in the steering wheel 5. The steering holding sensor 5*a* outputs a signal depending on an electrostatic capacitance, which is different between when the steering wheel 5 is held by the driver and when not held.

The steering controller 6 is an ECU having a communication interface, a memory, and a processor. The steering controller 6 is an example of a control device equipped in the vehicle 1, for accepting a signal corresponding to an operation by the driver and a steering holding signal from the steering wheel 5 and sends them to the travel controller 7.

The travel controller 7 is an ECU having a communication interface, a memory, and a processor. The travel controller 7 determines the presence of a driving operation by the driver of the vehicle during autonomous driving and controls an acceleration rate by accelerating the vehicle in accordance with the operation for accelerating the vehicle with limiting the acceleration rate of the vehicle not more than a predetermined upper limit of acceleration rate.

Figure 2:
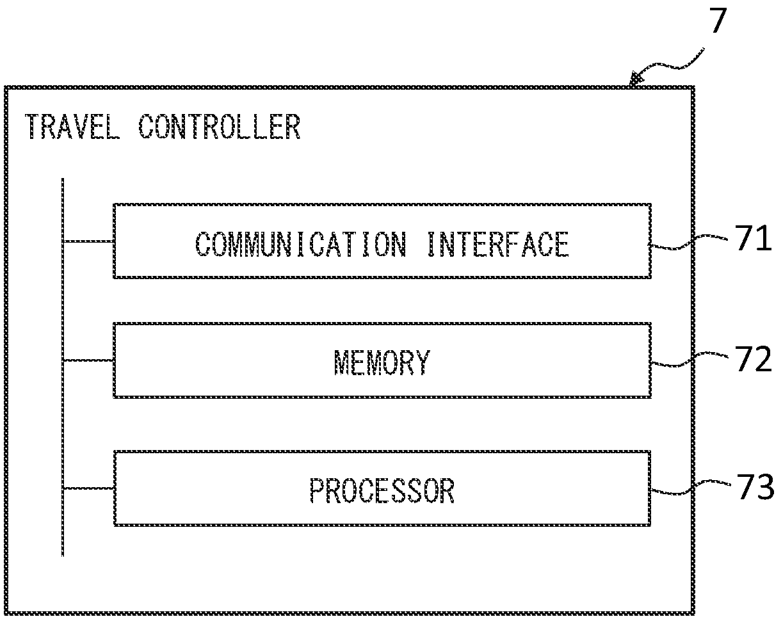
FIG. 2 schematically illustrates the hardware of the travel controller.

FIG. 2 schematically illustrates the hardware of the travel controller 7. The travel controller 7 includes a communication interface 71, a memory 72, and a processor 73.

The communication interface 71, which is an example of a communication unit, includes a communication interface circuit for connecting the travel controller 7 to the in-vehicle network. The communication interface 71 provides the received data for the processor 73, and outputs data provided from the processor 73 to an external device.

The memory 72 includes a volatile and nonvolatile semiconductor memories. The memory 72 stores various data used for processing by the processor 73, such as a formula for setting the upper limit of acceleration rate corresponding to the time period from when detecting the operation of the driver. The memory 72 also stores various application programs, such as a travel control program to execute therefor.

The processor 73, which is an example of a control unit, includes one or more processors and a peripheral circuit thereof. The processor 73 may further include another operating circuit, such as a logic-arithmetic unit, an arithmetic unit, or a graphics processing unit.

Figure 3:
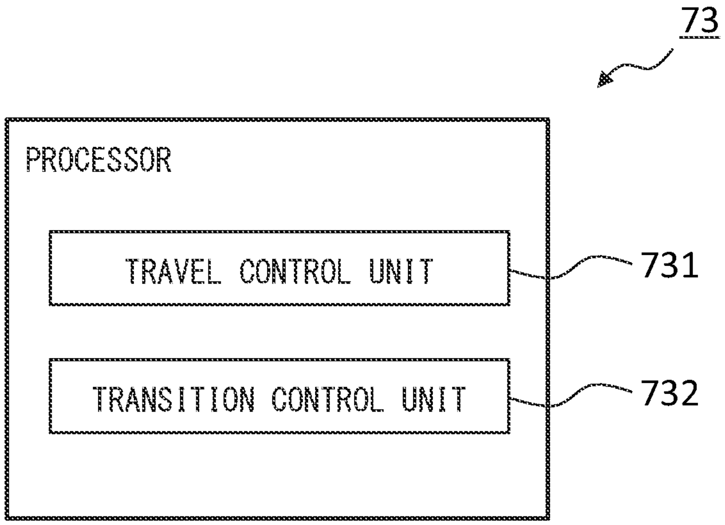
FIG. 3 is a functional block diagram of a processor included in the travel controller.

FIG. 3 is a functional block diagram of the processor 73 included in the travel controller 7.

As its functional blocks, the processor 73 of the travel controller 7 includes a travel control unit 731 and a transition control unit 732. These units included in the processor 73 are functional modules implemented by a computer program executed on the processor 73. The computer program for achieving the functions of the units of the processor 73 may be provided in a form recorded on a computer-readable and portable medium, such as a semiconductor memory, a magnetic recording medium, or an optical recording medium. Alternatively, the units included in the processor 73 may be implemented in the travel controller 7 as separate integrated circuits, microprocessors, or firmware.

The travel control unit 731 controls the acceleration and deceleration of the vehicle 1. The travel control unit 731 may also control the steering of the vehicle 1 in addition to the acceleration and deceleration of the vehicle 1.

The travel control unit 731 receives a surrounding image generated by the surrounding camera 2 through the communication interface 71. The travel control unit 731 detects lane lines in the surroundings of the vehicle 1 by inputting a received surrounding image to a classifier that has been trained in advance so as to detect lane lines. The travel control unit 731 also detects other vehicles in the surroundings of the vehicle 1 by inputting the received surrounding image to a classifier that has been trained in advance so as to detect other vehicles.

The classifier may be, for example, a convolutional neural network (CNN) including a plurality of convolution layers connected in series from the input toward the output. A CNN that has been trained using a plurality of images including lane lines or other vehicles as training data operates as a classifier to detect lane lines or other vehicles from the images.

The travel control unit 731 determines the acceleration rate and amount of steering of the vehicle 1, for example, so that the vehicle 1 suitably travels on the lane based on the detected lane lines and keeps the distance to the detected other vehicle longer than a predetermined distance. The travel control unit 731 outputs a control signal corresponding to the determined acceleration rate and amount of steering to the travel mechanisms (not shown) of the vehicle 1 through the communication interface 71. The travel mechanisms include, for example, a drive source such as an engine or motor for supplying power to the vehicle 1, a brake for decreasing the traveling speed of the vehicle 1, and a steering mechanism for steering the vehicle 1.

The transition control unit 732 determines whether an operation by the driver of the vehicle 1 for accelerating the vehicle 1 has been detected during autonomous driving.

The transition control unit 732 can determine whether the vehicle 1 is under autonomous driving by reference to the state of operation of the travel control unit 731. The transition control unit 732 can determine whether an operation for accelerating the vehicle 1 (an increase of the pressure on the accelerator pedal 3) has been detected based on a signal received from the acceleration controller 4 through the communication interface 71.

The transition control unit 732 determines whether the grip by the driver on the steering wheel 5 has been detected during autonomous driving.

The transition control unit 732 can determine whether the grip by the driver on the steering wheel 5 has been detected based on a signal received from the steering controller 6 through the communication interface 71.

When the operation by the driver for accelerating the vehicle 1 and the grip by the driver on the steering wheel 5 are detected during autonomous driving, the transition control unit 732 accelerates the vehicle 1 in accordance with the operation for accelerating the vehicle 1 with limiting the acceleration rate of the vehicle 1 not more than a predetermined upper limit of acceleration rate. The transition control unit 732 also increases the upper limit of acceleration rate in accordance with the elapse of time from detection of the operation for accelerating the vehicle 1 and the grip on the steering wheel 5.

Figure 4:
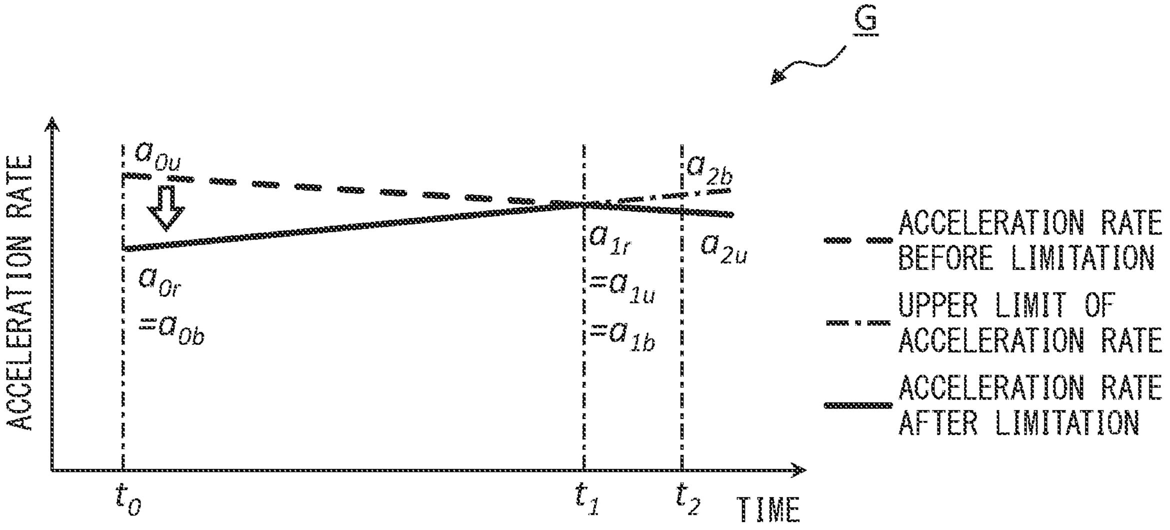
FIG. 4 is a diagram for explaining a change in acceleration rate along with an elapse of time.

FIG. 4 is a diagram for explaining a change in acceleration rate along with an elapse of time.

In the graph G shown in FIG. 4, the horizontal axis indicates the time and the vertical axis indicates the acceleration rate of the vehicle 1. The data series shown by the broken line in the graph G indicates the acceleration rates determined in accordance with operations by the driver for accelerating the vehicle 1 before the limitation.

An acceleration rate before the limitation may be the acceleration rate corresponding to a combined control value calculated by combining the manual control value corresponding to the operation by the driver and a control value for autonomous control by the travel control unit 731 at a predetermined ratio (for example 50:50). The combined control value may be calculated so that the ratio of the manual control value rises along with the elapse of time.

The data series shown by the one-dot chain line in the graph G indicates the upper limit of acceleration rate used for limitation of the acceleration rate of the vehicle 1 by the transition control unit 732. The upper limit of acceleration rate increases along with the elapse of time. The data series shown by the solid line in the graph G indicates the acceleration rate of the vehicle 1 limited by the transition control unit 732.

Suppose that the operation for accelerating the vehicle 1 and the grip of the steering wheel 5 were detected at the point of time $t_0$. At point of time $t_0$, the acceleration rate before the limitation $a_{0\_u}$ is larger than the upper limit of acceleration rate $a_{0\_b}$ used for limitation of the acceleration rate of the vehicle 1 by the transition control unit 732. In this case, the transition control unit 732 limits the acceleration rate of the vehicle 1 and sets the upper limit of acceleration rate $a_{0\_b}$ as the acceleration rate of the vehicle 1 after limitation $a_{0\_r}$.

In the example of FIG. 4, suppose that the acceleration rate before the limitation decreases along with the elapse of time. On the other hand, the upper limit of acceleration rate increases along with the elapse of time. The acceleration rate before the limitation $a_{1\_u}$ matches the upper limit of acceleration rate $a_{1\_b}$ at the point of time $t_1$ after the point of time $t_0$. Therefore, the acceleration rate of the vehicle 1 after the limitation $a_{1\_r}$ at the point of time $t_1$ is equal to the acceleration rate before the limitation $a_{1\_u}$ and the upper limit of acceleration rate $a_{1\_b}$.

In the example of FIG. 4, at a point of time after the point of time $t_1$ (for example, the point of time $t_2$), the acceleration rate before the limitation $a_{1\_u}$ falls below the upper limit of acceleration rate $a_{1\_b}$. Therefore, the acceleration rate $a_{2\_r}$ of the vehicle 1 at the point of time $t_2$ is not limited by the upper limit value of acceleration rate and set at the acceleration rate $a_{2\_u}$.

The transition control unit 732 may generate a control signal for the drive source so that the drive torque generated by the drive source of the vehicle 1 does not exceed a torque upper limit corresponding to the upper limit of the acceleration rate. By generating a control signal in this way, the transition control unit 732 can accelerate the vehicle 1 in accordance with the operation for accelerating the vehicle 1 with limiting the acceleration rate of the vehicle 1 not more than the predetermined upper limit of acceleration rate.

Figure 5:
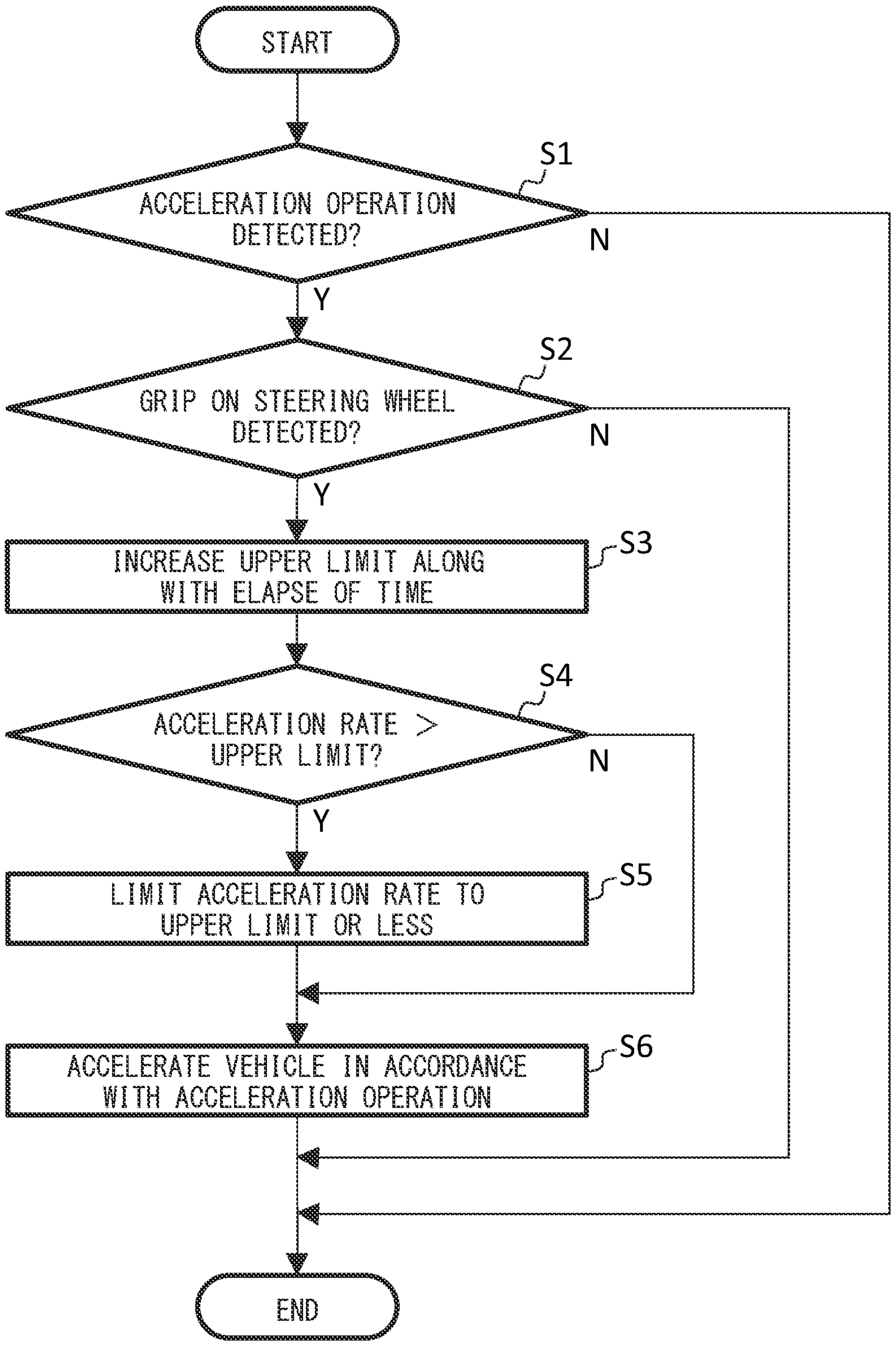
FIG. 5 is a flowchart of a process for travel control.

FIG. 5 is a flowchart of travel control processing. The processor 73 of the travel controller 7 repeatedly performs the travel control processing described below while the vehicle 1 is traveling under autonomous control.

First, the transition control unit 732 of the processor 73 of the travel controller 7 determines whether an operation by a driver of a vehicle 1 accelerating the vehicle 1 is detected (step S1). When the operation for accelerating the vehicle 1 is not detected (step S1: N), the transition control unit 732 terminates the travel control processing.

When the operation for accelerating the vehicle 1 is detected (step S1: Y), the transition control unit 732 determines whether the grip on the steering wheel 5 by the driver is detected (step S2). When the grip on the steering wheel 5 is not detected (step S2: N), the transition control unit 732 terminates the travel control processing.

When the grip on the steering wheel 5 is detected (step S2: Y), the transition control unit 732 increases upper limit of acceleration rate along with the elapse of time from detection of the operation for accelerating the vehicle 1 and the grip on the steering wheel 5 (step S3).

Next, the transition control unit 732 determines whether the acceleration rate before the limitation determined in accordance with the operation by the driver for accelerating the vehicle 1 is greater than the upper limit of acceleration rate (step S4). When the acceleration rate before the limitation is not greater than the upper limit of acceleration rate (step S4: N), the processing of the travel controller 7 proceeds to step S6 described below.

If the acceleration rate before the limitation is greater than the upper limit of acceleration rate (step S4: Y), the transition control unit 732 limits the acceleration rate of the vehicle 1 not more than the upper limit of acceleration rate (step S5).

The transition control unit 732 accelerates the vehicle 1 so as to travel at an acceleration rate set in accordance with the operation for accelerating the vehicle 1 (step S6) and terminates the travel control processing.

The travel controller 7 can inhibit sudden acceleration when the operating device of the vehicle is operated during autonomous driving even though the vehicle accelerates in accordance with an amount of operation of the operating device by the driver by performing the travel control processing as described above.

According to a modified example, the transition control unit 732 detects an operation by the driver for changing lanes. The operation by the driver for changing lanes includes, for example, operation of a signal lever (not shown) for turning on a turn signal (not shown). The signal lever outputs a signal corresponding to the operation by the driver to the steering controller 6. The transition control unit 732 acquires the signal corresponding to the operation of the signal lever through the communication interface 71. The transition control unit 732 may detect the operation by the driver for changing lanes when receiving an operation of the steering wheel 5 over a predetermined steering threshold toward the direction of the turn signal turned on by operation of the signal lever together with operation of the signal lever.

In this modified example, when the operation by the driver for changing lanes is detected, the transition control unit 732 increases the amount of increase of the upper limit of acceleration rate along with the elapse of time from detection of the operation for accelerating the vehicle 1 and the grip on the steering wheel 5 in comparison to when the operation by the driver for changing lanes is not detected.

According to a different modified sample, the transition control unit 732 detects the direction of gaze of the driver.

The vehicle 1 has a driver monitor camera (not shown) for generating a driver image representing the driver of the vehicle. The driver monitor camera 3 has a two-dimensional detector constructed from an array of optoelectronic transducers having sensitivity to infrared light and a focusing optical system that forms an image of a target region on the two-dimensional detector. The driver monitor camera has a light source emitting infrared light. The driver monitor camera is, for example, mounted in a front area in the interior of the vehicle and oriented toward the face of the driver seated on the driver's seat and is connected to the travel controller 7 through an in-vehicle network. The driver monitor camera emits infrared light to the driver every predetermined capturing period (e.g., 1/30 to 1/10 seconds) and outputs driver images showing the driver in time series.

The transition control unit 732 detects the direction of gaze of the drive, for example, by detecting the pupil and the cornea reflected image of the light source by performing template matching between the driver image and respective templates of the pupil and the reflected corneal images of the light source and thereby detecting the direction of gaze of the driver based on the positional relationship thereof.

In this modified example, when the direction of gaze of the driver is not oriented in the travel direction of the vehicle 1, the transition control unit 732 decreases the amount of increase of the upper limit of acceleration rate along with the elapse of time from detection of the operation for accelerating the vehicle 1 and the grip on the steering wheel 5 in comparison to when the direction of gaze of the driver is oriented in the direction of advance of the vehicle 1.

Note that those skilled in the art can apply various changes, substitutions, and modifications without departing from the spirit and scope of the present disclosure.

What is claimed is:

1. A travel control method for autonomously controlling acceleration and deceleration of a vehicle, comprising:

in a state in which autonomous driving in which acceleration and deceleration of the vehicle are autonomously controlled and an operation by a driver of the vehicle for accelerating the vehicle and a grip by the driver on a steering wheel accepting operations by the driver for designating a steering direction and a steering amount of the vehicle are detected, limiting the acceleration rate of the vehicle to be less than or equal to an upper limit of the acceleration rate;

accelerating the vehicle in accordance with the operation for accelerating the vehicle; and initiating an increase in the upper limit of the acceleration rate from a time in which both of the operation for accelerating the vehicle and the grip by the driver on the steering wheel are detected;

decreasing an amount of the increase in the upper limit of the acceleration rate along the elapse of time when a gaze direction of the driver is not oriented in a travel direction of the vehicle compared to when the gaze direction of the driver is oriented in the travel direction of the vehicle, wherein the upper limit of the acceleration rate linearly increases along an elapse of time starting from the time in which both of the operation for accelerating the vehicle and the grip by the driver of the steering wheel are detected.

2. A travel controller comprising:

a processor configured to, in a state in which autonomous driving in which acceleration and deceleration of a vehicle are autonomously controlled and an operation by a driver of the vehicle for accelerating the vehicle and a grip by the driver on a steering wheel accepting operations by the driver for designating a steering direction and a steering amount of the vehicle are detected, control an acceleration rate of the vehicle by accelerating the vehicle in accordance with the operation for accelerating the vehicle by limiting the acceleration rate of the vehicle to be less than or equal to an upper limit of the acceleration rate and initiating an increase in the upper limit of the acceleration rate from a time in which both of the operation for accelerating the vehicle and the grip by the driver on the steering wheel are detected; and decrease an amount of the increase in the upper limit of the acceleration rate along the elapse of time when a gaze direction of the driver is not oriented in a travel direction of the vehicle compared to when the gaze direction of the driver is oriented in the travel direction of the vehicle, wherein the upper limit of the acceleration rate linearly increases along an elapse of time starting from the time in which both of the operation for accelerating the vehicle and the grip by the driver of the steering wheel are detected.

3. The travel controller according to claim 2, wherein the processor, is further configured to increase an amount of the increase in the upper limit of the acceleration rate along the elapse of time when an operation by the driver for changing lanes is detected compared to when the operation by the driver for changing lanes is not detected.

4. The travel controller according to claim 2, wherein the control of the acceleration rate of the vehicle comprises limiting the acceleration rate corresponding to a combined control value calculated by combining a manual control value corresponding to the operation by the driver for accelerating the vehicle and a control value for accelerating the vehicle by the autonomous control at a ratio not more than the upper limit of the acceleration rate.

5. The travel controller according to claim 4, wherein the combined control value is calculated such that the ratio of the manual control value increases along the elapse of time from the time in which the operation for accelerating the vehicle and the grip by the driver on the steering wheel are detected.

6. A non-transitory computer-readable medium having a computer program for travel control stored therein, the computer program causing a computer mounted on a vehicle to execute a process comprising:

in a state in which autonomous driving in which acceleration and deceleration of the vehicle are autonomously controlled and an operation by a driver of the vehicle for accelerating the vehicle and a grip by the driver on a steering wheel accepting operations by the driver for designating a steering direction and a steering amount of the vehicle are detected, limiting the acceleration rate of the vehicle to be less than or equal to an upper limit of the acceleration rate;

accelerating the vehicle in accordance with the operation for accelerating the vehicle; and initiating an increase in the upper limit of the acceleration rate from a time in which both of the operation for accelerating the vehicle and the grip by the driver on the steering wheel are detected; and decreasing an amount of the increase in the upper limit of the acceleration rate along the elapse of time when a gaze direction of the driver is not oriented in a travel direction of the vehicle compared to when the gaze direction of the driver is oriented in the travel direction of the vehicle, wherein the upper limit of the acceleration rate linearly increases along an elapse of time starting from the time in which both of the operation for accelerating the vehicle and the grip by the driver of the steering wheel are detected.

* * * * *